United States Patent
Lee et al.

(10) Patent No.: US 11,650,924 B2
(45) Date of Patent: May 16, 2023

(54) MEMORY CONTROLLER AND METHOD OF OPERATING THE SAME

(71) Applicant: SK hynix Inc., Gyeonggi-do (KR)

(72) Inventors: Na Young Lee, Gyeonggi-do (KR); Ku Ik Kwon, Gyeonggi-do (KR); Kyeong Seok Kim, Gyeonggi-do (KR); Byong Woo Ryu, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/443,671

(22) Filed: Jul. 27, 2021

(65) Prior Publication Data

US 2022/0269610 A1    Aug. 25, 2022

(30) Foreign Application Priority Data

Feb. 22, 2021  (KR) .................... 10-2021-0023616

(51) Int. Cl.
*G06F 12/00* (2006.01)
*G06F 12/0862* (2016.01)

(52) U.S. Cl.
CPC .. *G06F 12/0862* (2013.01); *G06F 2212/1021* (2013.01); *G06F 2212/602* (2013.01)

(58) Field of Classification Search
CPC ......... G06F 12/0862; G06F 2212/2021; G06F 2212/602
See application file for complete search history.

(56) References Cited

U.S. PATENT DOCUMENTS

| | | | |
|---|---|---|---|
| 2009/0019229 A1* | 1/2009 | Morrow | G06F 12/0862 711/137 |
| 2014/0108740 A1* | 4/2014 | Rafacz | G06F 12/0862 711/137 |
| 2016/0154750 A1* | 6/2016 | Park | G06F 3/061 711/153 |
| 2021/0149805 A1* | 5/2021 | Pinho | G06N 20/10 |
| 2022/0058132 A1* | 2/2022 | Roberts | G06F 12/0895 |

FOREIGN PATENT DOCUMENTS

| | | |
|---|---|---|
| KR | 10-1300657 B1 | 8/2013 |
| KR | 10-2019-0098394 A | 8/2019 |

* cited by examiner

*Primary Examiner* — Gurtej Bansal
(74) *Attorney, Agent, or Firm* — IP & T Group LLP

(57) ABSTRACT

Provided herein is a memory controller for controlling a memory device. The memory controller includes a workload detector configured to determine a change in workload based on reception of a changed request from a host or a change in clock received from an external device, a device performance controller configured to determine, if the workload is determined as changed, read performance based on a ratio of a size of data output to the host to a size of data requested from the host every preset period and configured to output a read-look-ahead (RLA) command to the memory device based on the determined read performance, a buffer memory configured to store data read from the memory device in response to the RLA command and a memory size controller configured to control a size of the buffer memory. The RLA command instructs to output data which is frequently requested from the host.

19 Claims, 11 Drawing Sheets

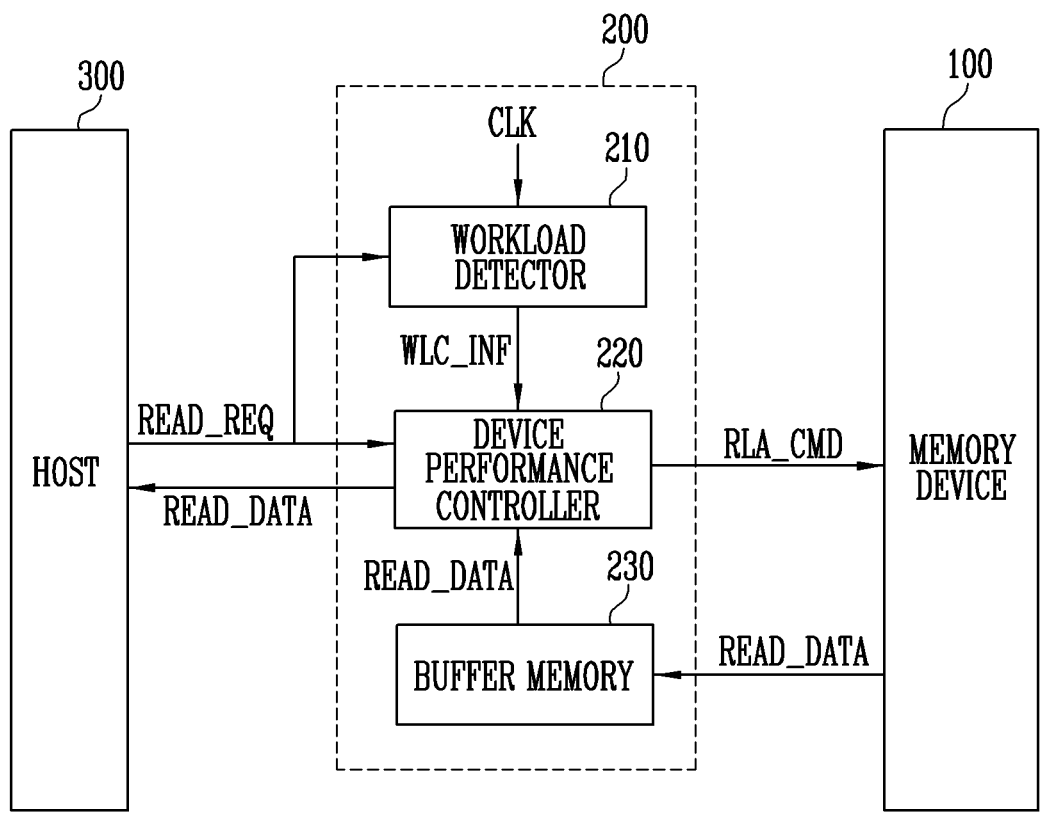

MEMORY CONTROLLER AND METHOD OF OPERATING THE SAME

CROSS-REFERENCE TO RELATED APPLICATION

The present application claims priority under 35 U.S.C. § 119(a) to Korean patent application number 10-2021-0023616 filed on Feb. 22, 2021, the entire disclosure of which is incorporated by reference herein.

BACKGROUND

Field of Invention

Various embodiments of the present disclosure generally relate to an electronic device, and more particularly, to a memory controller and a method of operating the memory controller.

Description of Related Art

Generally, a storage device is a device which stores data under control of a host device such as a computer, a smartphone, or a smart pad. According to the type of device provided to store data, examples of the storage device may be classified into a device such as a hard disk drive (HDD) which stores data in a magnetic disk, and a device such as a solid state drive (SSD) or a memory card which stores data in a semiconductor memory, particularly, a nonvolatile memory.

The storage device may include a memory device in which data is stored, and a memory controller configured to store data in the memory device. Memory devices may be classified into volatile memories and nonvolatile memories. Representative examples of the nonvolatile memories may include a read only memory (ROM), a programmable ROM (PROM), an electrically programmable ROM (EPROM), an electrically erasable and programmable ROM (EEPROM), a flash memory, a phase-change random access memory (PRAM), a magnetic RAM (MRAM), a resistive RAM (RRAM), a ferroelectric RAM (FRAM), etc.

SUMMARY

Various embodiments of the present disclosure are directed to a memory controller and a method of operating the memory controller, which are intended to enhance the performance of a storage device by changing the size of a buffer memory depending on the read performance of the storage device.

An embodiment of the present disclosure may provide for a memory controller for controlling a memory device, the memory controller including a workload detector configured to determine a change in workload based on reception of a changed request from a host or a change in clock received from an external device, a device performance controller configured to determine, if the workload is determined as changed, read performance based on a ratio of a size of data output to the host to a size of data requested from the host every preset period and configured to output a read-look-ahead (RLA) command to the memory device based on the determined read performance, a buffer memory configured to store data read from the memory device in response to the RLA command and a memory size controller configured to control a size of the buffer memory, wherein the RLA command instructs to output data which is frequently requested from the host.

An embodiment of the present disclosure may provide for a method of operating a memory controller configured to control a memory device, the method including determining a change in workload based on reception of a changed request from a host or a change in clock received from an external device, determining, if the workload is determined as changed, read performance based on a ratio of a size of data output to the host to a size of data requested from the host every preset period, outputting a read-look-ahead (RLA) command to the memory device based on the determined read performance and storing data read from the memory device in response to the RLA command in a buffer memory, wherein the RLA command instructs to output data which is frequently requested from the host.

An embodiment of the present disclosure may provide for a memory system comprising: a memory device configured to store data, a cache configured to cache data read from the device and to be provided to an external and a controller configured to, perform, according to a current read performance of the system, a read-look-ahead (RLA) operation on data stored in the device when the system has a heavy workload, and adjust, according to a current read performance of the system, a size of the cache when the system has a light workload, wherein the controller is further configured to adjust the size according to a current read performance of the system during the RLA operation, and wherein the current read performance is a ratio of a first amount to a second amount during a current amount of time, the first amount being a data amount output from the system in response to one or more requests from the external and the second amount being a data amount requested by the requests.

BRIEF DESCRIPTION OF THE DRAWINGS

FIG. 4 is a diagram illustrating a process of outputting a RLA command in accordance with an embodiment of the present disclosure.

FIG. 5 is a diagram illustrating a method of determining read performance in accordance with an embodiment of the present disclosure.

DETAILED DESCRIPTION

Specific structural or functional descriptions in the embodiments of the present disclosure introduced in this specification are only for description of the embodiments of the present disclosure. The descriptions should not be construed as being limited to the embodiments described in this specification.

Figure 1:
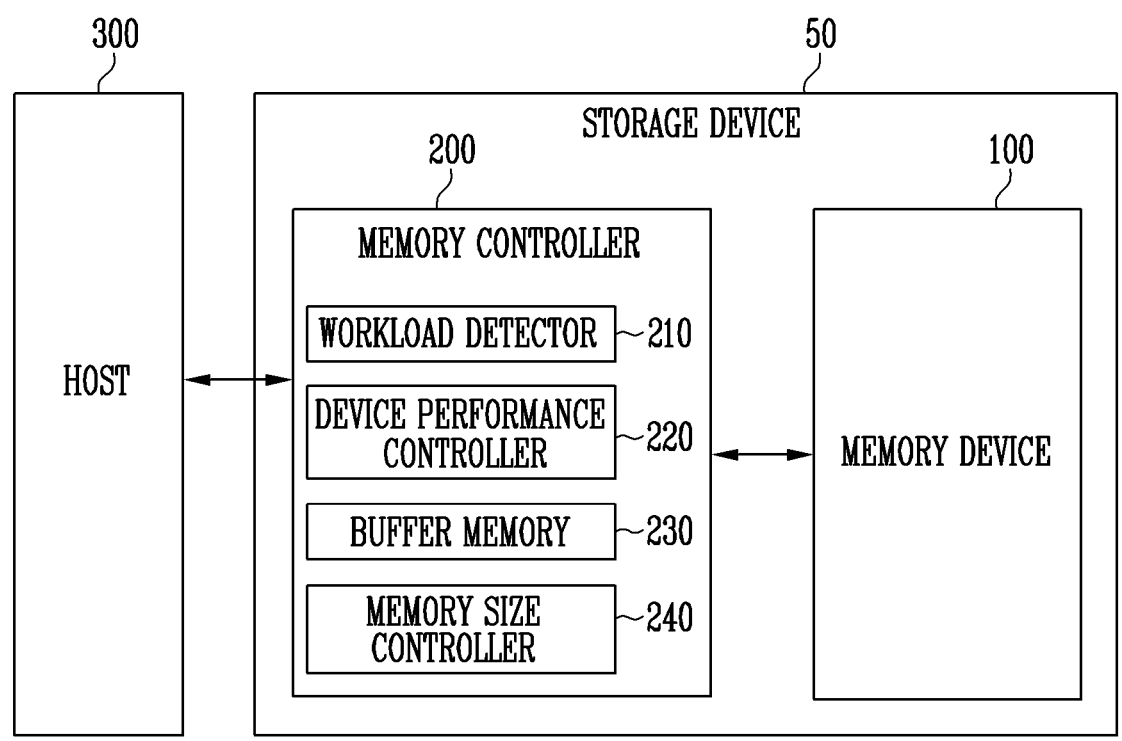
FIG. 1 is a block diagram illustrating a storage device in accordance with an embodiment of the present disclosure.

FIG. 1 is a block diagram illustrating a storage device in accordance with an embodiment of the present disclosure.

Referring to FIG. 1, the storage device 50 may include a memory device 100 and a memory controller 200.

The storage device 50 may be a device configured to store data under control of a host 300 such as a cellular phone, a smartphone, an MP3 player, a laptop computer, a desktop computer, a game machine, a TV, a tablet PC, or an in-vehicle infotainment system.

The storage device 50 may be manufactured as any of various types of storage devices depending on a host interface, which is a communication system for communicating with the host 300. For example, the storage device 50 may be configured of any of various types of storage devices such as an SSD, MMC, eMMC, RS-MMC, or micro-MMC type multimedia card, an SD, mini-SD, micro-SD type secure digital card, a universal serial bus (USB) storage device, a universal flash storage (UFS) device, a personal computer memory card international association (PCMCIA) card type storage device, a peripheral component interconnection (PCI) card type storage device, a PCI-express (PCI-E) type storage device, a compact flash (CF) card, a smart media card, and a memory stick.

The storage device 50 may be manufactured in the form of any of various package types. For instance, the storage device 50 may be manufactured in the form of any of various package types such as a package on package (POP) type, a system in package (SIP) type, a system on chip (SOC) type, a multi-chip package (MCP) type, a chip on board (COB) type, a wafer-level fabricated package (WFP) type, and a wafer-level stack package (WSP) type.

The memory device 100 may store data therein. The memory device 100 may operate under control of the memory controller 200. The memory device 100 may include a memory cell array including a plurality of memory cells configured to store data therein. The memory cell array may include a plurality of memory blocks. Each memory block may include a plurality of memory cells. A plurality of memory cells may form a plurality of pages. In an embodiment, each page may be the unit of storing data in the memory device 100 or reading stored data from the memory device 100. Each memory block may be the unit of erasing data.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory device, a resistive random access memory (RRAM), a phase-change random access memory (PRAM), a magnetoresistive random access memory (MRAM), a ferroelectric random access memory (FRAM), or a spin transfer torque random access memory (STT-RAM). In this specification, for the sake of description, the memory device 100 is a NAND flash memory.

The memory device 100 may be implemented in a two-dimensional array structure or a three-dimensional array structure. Hereinafter, although a three-dimensional array structure will be described for illustrative purposes, the present disclosure is not limited to the three-dimensional array structure. The present disclosure may be applied not only to a flash memory in which a charge storage layer is formed of a conductive floating gate (FG), but also to a charge trap flash (CTF) memory in which a charge storage layer is formed of an insulating layer.

In an embodiment, the memory device 100 may be operated in a single-level cell (SLC) manner of storing one data bit in each memory cell. Alternatively, the memory device 100 may be operated in a manner of storing at least two data bits in each memory cell. For example, the memory device 100 may be operated in a multi-level cell (MLC) manner of storing two data bits in each memory cell, a triple-level cell (TLC) manner of storing three data bits in each memory cell, or a quad-level cell (QLC) manner of storing four data bits in each memory cell.

The memory device 100 may receive a command and an address from the memory controller 200 and access an area of the memory cell array that is selected by the address. That is, the memory device 100 may perform an operation corresponding to the command on the area selected by the address. For example, the memory device 100 may perform a write (program) operation, a read operation, or an erase operation, in response to a received command. For example, when a program command is received, the memory device 100 may program data in an area selected by an address. If a read command is received, the memory device 100 may read data from an area selected by an address. If an erase command is received, the memory device 100 may erase data from an area selected by an address.

The memory controller 200 may control overall operations of the storage device 50.

When a power supply voltage is applied to the storage device 50, the memory controller 200 may execute firmware. In the case where the memory device 100 is a flash memory device, the memory controller 200 may execute firmware such as a flash translation layer (FTL) for controlling communication between the host 300 and the memory device 100.

In an embodiment, the memory controller 200 may include firmware (not shown) which receives data and a logical block address (LBA) from the host 300, and translates the LBA into a physical block address (PBA) indicating addresses of memory cells in which data is to be stored, the memory cells being included in the memory device 100. The memory controller 200 may store, in a buffer memory 230, a logical-physical address mapping table indicating a mapping relationship between logical block addresses LBA and physical block addresses PBA.

The memory controller 200 may control the memory device 100 to perform a program operation, a read operation, or an erase operation in response to a request from the host 300. For example, if a program request is received from the host 300, the memory controller 200 may change the program request into a program command, and provide the program command, a PBA, and data to the memory device 100. If a read request along with an LBA is received from the host 300, the memory controller 200 may change a read request into a read command, select a PBA corresponding to the LBA, and provide the read command and the PBA to the memory device 100. If an erase request along with an LBA is received from the host 300, the memory controller 200 may change the erase request into an erase command, select a PBA corresponding to the LBA, and provide the erase command and the PBA to the memory device 100.

In an embodiment, the memory controller 200 may autonomously generate a program command, an address and data without a request from the host 300, and transmit them to the memory device 100. For example, the memory controller 200 may provide a command, an address and data to the memory device 100 to perform background operations such as a program operation for wear leveling and a program operation for garbage collection.

In an embodiment, the memory controller 200 may include a workload detector 210. The workload detector 210 may detect a workload according to a request received from the host 300 and a workload according to a change in a clock CLK applied to the storage device 50.

For example, in the case of receiving a sequential read request or a sequential write request from the host 300, the workload detector 210 may detect that the workload has been changed. Since operations corresponding to sequential read requests or sequential write requests compared to other requests require more operations, the workload detector 210 may confirm that the workload has been changed after receiving the sequential read request or the sequential write request.

For example, if the clock CLK applied to the storage device 50 is changed, the workload detector 210 may detect that the workload has changed. Since the speed at which operations are performed varies according to the clock CLK, the workload detector 210 may detect that the workload has been changed based on the changed clock CLK.

In an embodiment, the memory controller 200 may include a device performance controller 220. The device performance controller 220 may detect the read performance of the storage device 50.

For example, the device performance controller 220 may detect the read performance based on a ratio of the size of data output to the host 300 to the size of data requested from the host 300 during a reference amount of time. The read performance may be higher as the ratio increases. In contrast, the read performance may be lower as the ratio decreases.

In an embodiment, the memory controller 200 may include a buffer memory 230. The memory controller 200 may control data exchange between the host 300 and the buffer memory 230. Alternatively, the memory controller 200 may temporarily store system data for controlling the memory device 100 in the buffer memory 230. For example, the memory controller 200 may temporarily store, in the buffer memory 230, data input from the host 300, and thereafter transmit the data temporarily stored in the buffer memory 230 to the memory device 100. The size of the buffer memory 230 may be variable.

In various embodiments, the buffer memory 230 may be used as an operating memory or a cache memory of the memory controller 200. The buffer memory 230 may store codes or commands to be executed by the memory controller 200. Alternatively, the buffer memory 230 may store data to be processed by the memory controller 200.

In an embodiment, the buffer memory 230 may be embodied by an SRAM or a DRAM such as a double data rate synchronous dynamic random access memory (DDR SDRAM), a DDR4 SDRAM, a low power double data rate4 (LPDDR4) SDRAM, a graphics double data rate (GDDR) SDRAM, a low power DDR (LPDDR), or a rambus dynamic random access memory (RDRAM).

In various embodiments, the buffer memory 230 may be coupled to the outside of the storage device 50. In this case, volatile memory devices coupled to the outside of the storage device 50 may perform the function of the buffer memory 230.

In an embodiment, the memory controller 200 may include a memory size controller 240. The memory size controller 240 may control the size of the buffer memory 230.

For example, based on the read performance detected when the workload is changed, the size of the buffer memory 230 may be changed. To be more specific, the memory size controller 240 may increase the size of the buffer memory 230 until the read performance is maximized.

In an embodiment, in a situation where the workload is low, a read-look-ahead (RLA) operation may be performed such that data frequently read to the host 300 is read from the storage device 50 in advance, which enables a cache read operation.

For example, if the workload reaches a preset workload, a read-look-ahead (RLA) command for a RLA operation may be output to the memory device 100 at a preset time, and data corresponding to a preset size of the buffer memory 230 may be received from the memory device 100.

However, when an unexpected workload occurs or the clock CLK is changed, the read performance may not be improved due to the read-look-ahead (RLA) operation.

For example, the preset size of the buffer memory 230 may be 1 MB. However, in this case, when the storage device 50 receives a read request instructing to read data corresponding to a size larger than 1 MB from the host 300, the read performance may not be enhanced even if the read-look-ahead operation is performed.

Therefore, the present disclosure proposes a method of variably setting the size of the buffer memory 230 based on the read performance, after detecting a change in workload.

In an embodiment, the memory controller 200 may control at least two or more memory devices. In this case, the memory controller 200 may control the memory devices in an interleaving manner to enhance the operating performance.

The host 300 may communicate with the storage device 50 using at least one of various communication standards or interfaces, such as universal serial bus (USB), serial AT attachment (SATA), serial attached SCSI (SAS), high speed interchip (HSIC), small computer system interface (SCSI), peripheral component interconnection (PCI), PCI express (PCIe), nonvolatile memory express (NVMe), universal flash storage (UFS), secure digital (SD), multi-media card (MMC), embedded MMC (eMMC), dual in-line memory module (DIMM), registered DIMM (RDIMM), and load reduced DIMM (LRDIMM) communication methods.

Figure 2:
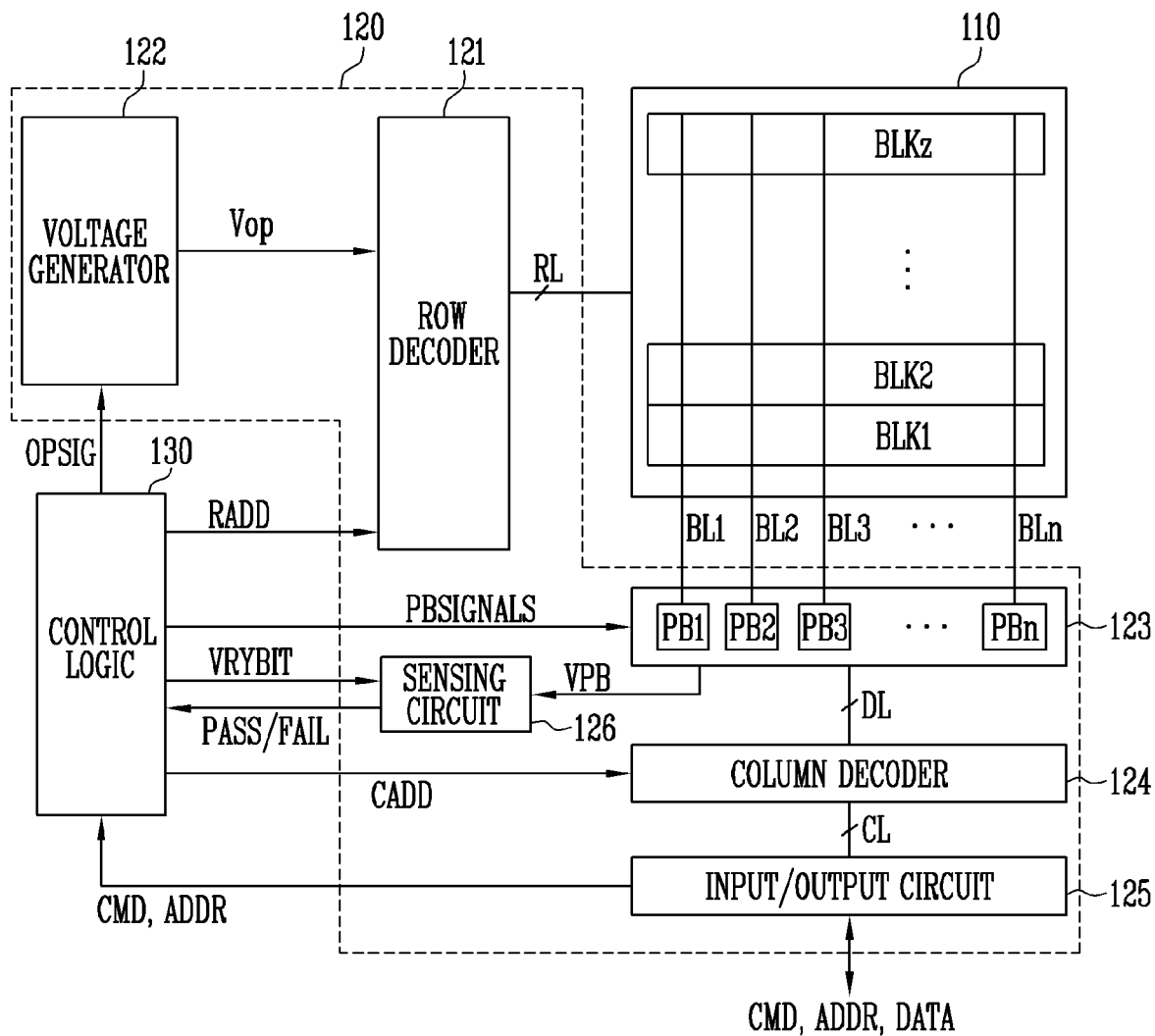
FIG. 2 is a diagram illustrating the configuration of a memory device of FIG. 1, in accordance with an embodiment of the present disclosure.

FIG. 2 is a diagram illustrating the configuration of a memory device of FIG. 1, in accordance with an embodiment of the present disclosure.

Referring to FIG. 2, the memory device 100 may include a memory cell array 110, a peripheral circuit 120, and a control logic 130.

The memory cell array 110 may include a plurality of memory blocks BLK1 to BLKz. The plurality of memory blocks BLK1 to BLKz are coupled to a row decoder 121 through row lines RL. The plurality of memory blocks BLK1 to BLKz may be coupled to a page buffer group 123 through bit lines BL1 to BLn. Each of the memory blocks BLK1 to BLKz may include a plurality of memory cells. In an embodiment, the plurality of memory cells may be nonvolatile memory cells. Memory cells coupled to the same word line may be defined as one page. Hence, each memory block may include a plurality of pages.

The row lines RL may include at least one source select line, a plurality of word lines, and at least one drain select line.

Each of the memory cells included in the memory cell array 110 may be formed of a single level cell (SLC) capable of storing a single data bit, a multi-level cell (MLC) capable of storing two data bits, a triple-level cell (TLC) capable of storing three data bits, or a quad-level cell (QLC) capable of storing four data bits.

The peripheral circuit 120 may perform a program operation, a read operation, or an erase operation on a selected area of the memory cell array 110 under control of the control logic 130. The peripheral circuit 120 may drive the memory cell array 110. For example, the peripheral circuit 120 may apply various operating voltages to the row liens RL and the bit lines BL1 to BLn or discharge the applied voltages, under control of the control logic 130.

The peripheral circuit 120 may include the row decoder 121, a voltage generator 122, the page buffer group 123, a column decoder 124, an input/output circuit 125, and a sensing circuit 126.

The row decoder 121 is coupled to the memory cell array 110 through the row lines RL. The row lines RL may include at least one source select line, a plurality of word lines, and at least one drain select line. In an embodiment, the word lines may include normal word lines and dummy word lines. In an embodiment, the row lines RL may further include a pipe select line.

The row decoder 121 may be configured to decode a row address RADD received from the control logic 130. The row decoder 121 may select at least one memory block of the memory blocks BLK1 to BLKz in response to the decoded address. The row decoder 121 may select at least one word line WL of the selected memory block in response to the decoded address so that voltages generated from the voltage generator 122 are applied to the at least one word line WL.

For example, during a program operation, the row decoder 121 may apply a program voltage to a selected word line and apply a program pass voltage having a level lower than that of the program voltage to unselected word lines. During a program verify operation, the row decoder 121 may apply a verify voltage to a selected word line and apply a verify pass voltage higher than the verify voltage to unselected word lines. During a read operation, the row decoder 121 may apply a read voltage to a selected word line and apply a read pass voltage higher than the read voltage to unselected word lines.

In an embodiment, an erase operation of the memory device 100 may be performed on a memory block basis. During an erase operation, the row decoder 121 may select one memory block in response to a decoded address. During the erase operation, the row decoder 121 may apply a ground voltage to word lines coupled to the selected memory block.

The voltage generator 122 may operate under control of the control logic 130. The voltage generator 122 may generate a plurality of voltages using an external supply voltage supplied to the memory device 100. In detail, the voltage generator 122 may generate various operating voltages Vop to be used for a program operation, a read operation, and an erase operation in response to an operating signal OPSIG. For example, the voltage generator 122 may generate a program voltage, a verify voltage, a pass voltage, a read voltage, an erase voltage, and so forth under control of the control logic 130.

In an embodiment, the voltage generator 122 may generate an internal supply voltage by regulating the external supply voltage. The internal supply voltage generated from the voltage generator 122 may be used as an operating voltage of the memory device 100.

In an embodiment, the voltage generator 122 may generate a plurality of voltages using an external power supply voltage or an internal power supply voltage.

For example, the voltage generator 122 may include a plurality of pumping capacitors for receiving the internal supply voltage and generate a plurality of voltages by selectively activating the plurality of pumping capacitors under control of the control logic 130.

The generated voltages may be supplied to the memory cell array 110 by the row decoder 121.

The page buffer group 123 may include first to n-th page buffers PB1 to PBn. The first to n-th page buffers PB1 to PBn are coupled to the memory cell array 110 through the first to n-th bit lines BL1 to BLn, respectively. The first to n-th page buffers PB1 to PBn may operate under control of the control logic 130. In detail, the first to n-th page buffers PB1 to PBn may operate in response to page buffer control signals PBSIGNALS. For instance, the first to n-th page buffers PB1 to PBn may temporarily store data received through the first to n-th bit lines BL1 to BLn, or sense voltages or currents of the first to n-th bit lines BL1 to BLn during a read operation or a verify operation.

In detail, during a program operation, the first to n-th page buffers PB1 to PBn may transmit data DATA received through the input/output circuit 125 to selected memory cells through the first to n-th bit lines BL1 to BLn when a program voltage is applied to a selected word line. The memory cells in the selected page are programmed based on the transmitted data DATA. During a program verify operation, the first to n-th page buffers PB1 to PBn may read page data by sensing voltages or currents received from selected memory cells through the first to n-th bit lines BL1 to BLn.

During a read operation, the first to n-th page buffers PB1 to PBn may read data DATA from memory cells of a selected page through the first to n-th bit lines BL1 to BLn, and output the read data DATA to the input/output circuit 125 under control of the column decoder 124.

During an erase operation, the first to n-th page buffers PB1 to PBn may float the first to n-th bit lines BL1 to BLn or apply erase voltages thereto.

The column decoder 124 may transmit data between the input/output circuit 125 and the page buffer group 123 in response to a column address CADD. For example, the column decoder 124 may exchange data with the first to n-th page buffers PB1 to PBn through data lines DL or exchange data with the input/output circuit 125 through column lines CL.

The input/output circuit 125 may transmit, to the control logic 130, a command CMD or an address ADDR received from the memory controller (200 of FIG. 1) described with reference to FIG. 1, or may exchange data DATA with the column decoder 124.

During a read operation or a verify operation, the sensing circuit 126 may generate a reference current in response to an enable bit signal VRYBIT, and may compare a sensing voltage VPB received from the page buffer group 123 with a reference voltage generated by the reference current and output a pass signal PASS or a fail signal FAIL.

The control logic 130 may output an operating signal OPSIG, a row address RADD, page buffer control signals PBSIGNALS, and an enable bit signal VRYBIT in response to a command CMD and an address ADD, and thus control the peripheral circuit 120. For example, the control logic 130 may control a read operation of a selected memory block in response to a sub-block read command and an address. Furthermore, the control logic 130 may control an erase operation of a selected sub-block included in a selected memory block, in response to a sub-block erase command and an address. In addition, the control logic 130 may determine whether the verify operation has passed or failed in response to a pass signal PASS or a fail signal FAIL.

Figure 3:
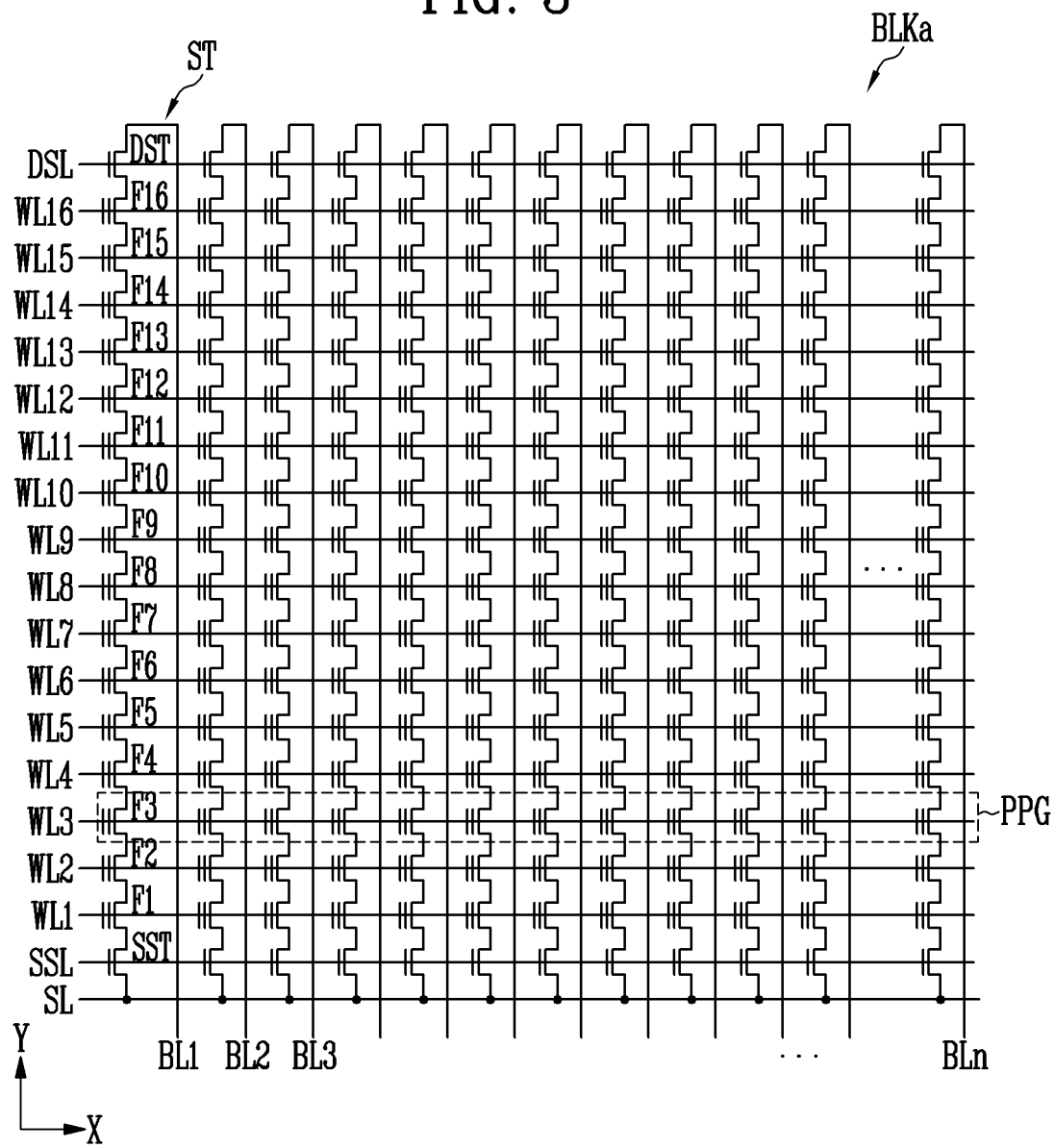
FIG. 3 is a diagram illustrating an embodiment of a memory cell array of FIG. 2, in accordance with an embodiment of the present disclosure.

FIG. 3 is a diagram illustrating an embodiment of a memory cell array of FIG. 2, in accordance with an embodiment of the present disclosure.

Referring to FIGS. 2 and 3, FIG. 3 is a circuit diagram showing a memory block BLKa among the plurality of memory blocks BLK1 to BLKz included in the memory cell array 110 of FIG. 2.

A first select line, word lines, and a second select line, which are arranged in parallel, may be coupled to the memory block BLKa. For instance, the word lines may be arranged in parallel between the first and second select lines. Here, the first select line may be a source select line SSL, and the second select line may be a drain select line DSL.

In more detail, the memory block BLKa may include a plurality of strings coupled between the bit lines BL1 to BLn and the source line SL. The bit lines BL1 to BLn may be respectively coupled to the strings, and the source lines SL may be coupled in common to the strings. The strings may have the same configuration; therefore, the string ST that is coupled to the first bit line BL1 will be described in detail by way of example.

The string ST may include a source select transistor SST, a plurality of memory cells F1 to F16, and a drain select transistor DST which are coupled in series to each other between the source line SL and the first bit line BL1. At least one source select transistor SST and at least one drain select transistor DST may be included in each string ST, and a larger number of memory cells than the number of memory cells F1 to F16 shown in the drawing may be included in each string ST.

A source of the source select transistor SST may be coupled to the source line SL, and a drain of the drain select transistor DST may be coupled to the first bit line BL1. The memory cells F1 to F16 may be coupled in series between the source select transistor SST and the drain select transistor DST. Gates of the source select transistors included in different strings may be coupled to the source select line SSL, gates of the drain select transistors may be coupled to the drain select line DSL, and gates of the memory cells F1 to F16 may be coupled to the plurality of word lines WL1 to WL16. Among the memory cells included in different strings, a group of memory cells coupled to the same word line may be referred to as a physical page PPG. Therefore, the number of physical pages included in the memory block BLKa may correspond to the number of word lines WL1 to WL16.

Each memory cell may store 1-bit data. This memory cell is typically called a single level cell (SLC). In this case, each physical page PPG may store data of a single logical page LPG. Data of each logical page LPG may include data bits corresponding to the number of memory cells included in a single physical page PPG. Alternatively, each memory cell may store 2- or more-bit data. This memory cell is typically called a multi-level cell (MLC). In this case, each physical page PPG may store data of two or more logical pages LPG.

A memory cell configured such that 2- or more-bit data is stored in each memory cell is called a multi-level cell (MLC). Recently, as the number of bits of data stored in each memory cell increases, the multi-level cell (MLC) means a memory cell in which 2-bit data is stored. A memory cell in which 3- or more-bit data is stored is called a triple level cell (TLC), and a memory cell in which 4- or more-bit data is stored is called a quadruple level cell (QLC). In addition, a memory cell storing data of multiple bits is being developed. This embodiment may be applied to the memory device 100 in which 2- or more-bit data is stored.

In an embodiment, the memory block may have a three-dimensional structure. Each memory block may include a plurality of memory cells stacked on a substrate. The multiple memory cells are arranged in a +X direction, a +Y direction, and a +Z direction.

FIG. 4 is a diagram illustrating a process of outputting a RLA command in accordance with an embodiment of the present disclosure.

Referring to FIG. 4, FIG. 4 illustrates a method in which a RLA command RLA_CMD for enhancing the read performance is output to the memory device 100, and read data READ_DATA corresponding to the RLA command RLA_CMD is received from the memory device 100. The memory controller 200 of FIG. 4 may include a workload detector 210, a device performance controller 220, and a buffer memory 230.

In an embodiment, the workload detector 210 may receive a read request READ_REQ from the host 300. The read request READ_REQ may be a request instructing to read data stored in the memory device 100. The read request READ_REQ may be a normal read request or a sequential read request. The normal read request may be a request instructing to read data stored in a specific location of the memory device 100, while the sequential read request may be a request instructing to read data continuously stored in the memory device 100.

When the read request READ_REQ received from the host 300 is the sequential read request, the workload detector 210 may detect that the workload has been changed. When the read request READ_REQ received from the host 300 is the sequential read request, data continuously stored in the memory device 100 may be read. Thus, a larger number of data may be read than when data is read in response to a normal read request. Consequently, since a larger number of data should be read, the workload may be changed, and the workload detector 210 may detect that the workload has been changed through the received read request READ_REQ.

In an embodiment, when the workload detector 210 detects that the workload has been changed, the workload detector 210 may generate workload change information WLC_INF and then output it to the device performance controller 220.

In an embodiment, the workload detector 210 may receive a clock CLK from an external device. If a cycle of the clock CLK received from the external device is changed, the workload detector 210 may detect that the workload has been changed. Since the cycle of the clock CLK is changed and thus the speed of an operation performed in the storage device 50 (see FIG. 1) is changed, the workload detector 210 may detect that the workload has been changed based on the changed clock CLK.

Even when the clock CLK is changed, the workload detector 210 may generate the workload change information WLC_INF and output it to the device performance controller 220.

In an embodiment, if the device performance controller 220 receives the workload change information WLC_INF from the workload detector 210, the device performance controller 220 may detect the performance of the storage device 50 (see FIG. 1). For instance, the device performance controller 220 may detect the read performance of the storage device 50 (see FIG. 1).

To be more specific, the device performance controller 220 may detect the read performance based on a ratio of the size of read data READ_Data output to the host 300 to the size of read data READ_DATA requested from the host 300 during a reference amount of time. In an embodiment, the read performance may be higher as the ratio increases. In contrast, the read performance may be lower as the ratio decreases. That is, the more the read data READ_DATA requested from the host 300 is output to the host 300 during the reference amount of time, the higher the read performance may be.

The device performance controller 220 may output to the memory device 100 the RLA command RLA_CMD for performing the RLA operation, based on the result of detecting the read performance. The RLA operation may be an operation of caching data in the buffer memory 230 in advance even without a request for the data from the host 300. A target of the RLA operation may be data frequently requested from the host 300. The data cached in the buffer memory 230 in advance through the RLA operation may be provided to the host 300 immediately in response to the request for the data from the host 300.

For instance, if the read performance is the maximum, the read-look-ahead (RLA) operation needs not be performed. Thus, the device performance controller 220 needs not output the RLA command RLA_CMD to the memory device 100. However, if the read performance is not maximum, the device performance controller 220 may output the RLA command RLA_CMD to the memory device 100 to cache in advance the data, which is frequently requested from the host 300 through the read-look-ahead (RLA) operation, in the buffer memory 230.

In an embodiment, the memory device 100 may output the data, which is frequently requested from the host 300, to the buffer memory 230, in response to the RLA command RLA_CMD, and the buffer memory 230 may store the received data. The data stored in the buffer memory 230 may be output through the device performance controller 220 to the host 300.

Consequently, the read-look-ahead (RLA) operation may be performed based on the read performance detected when the workload is changed.

However, if an area in which data received from the memory device 100 is to be stored is not sufficiently secured during the read-look-ahead (RLA) operation, the read performance may not be improved. Therefore, the present disclosure proposes a method of varying a size of the buffer memory 230, based on the read performance detected after the read-look-ahead (RLA) operation is performed.

FIG. 5 is a diagram illustrating a method of determining read performance in accordance with an embodiment of the present disclosure.

Referring to FIG. 5, FIG. 5 shows a method in which the device performance controller 220 of FIG. 4 detects the read performance READ_PF.

In an embodiment, if the device performance controller 220 (see FIG. 4) receives information indicating that the workload is changed from the workload detector 210, the device performance controller 220 (see FIG. 4) may detect the read performance READ_PF. A change in workload may be detected when the sequential read request is received from the host 300 (see FIG. 4) or the clock CLK received from the external device is changed.

In an embodiment, the read performance READ_PF may be determined as a ratio of the size of read data READ_Data output to the host 300 (see FIG. 4) to the size of request data REQ_DATA requested from the host 300 (see FIG. 4) during a reference amount of time. The request data REQ_DATA is data corresponding to a read request from the host 300 (see FIG. 4), and means data requested from the memory device 100 (see FIG. 4).

To be more specific, when the ratio of the read data READ_DATA to the request data REQ_DATA is '1', the read performance READ_PF may be a maximum MAX. However, when the ratio of the read data READ_DATA to the request data REQ_DATA is not '1', the read performance READ_PF may not be a maximum NOT MAX.

The present disclosure proposes a method of changing the size of the buffer memory to set the read performance READ_PF to the maximum.

Figure 6:
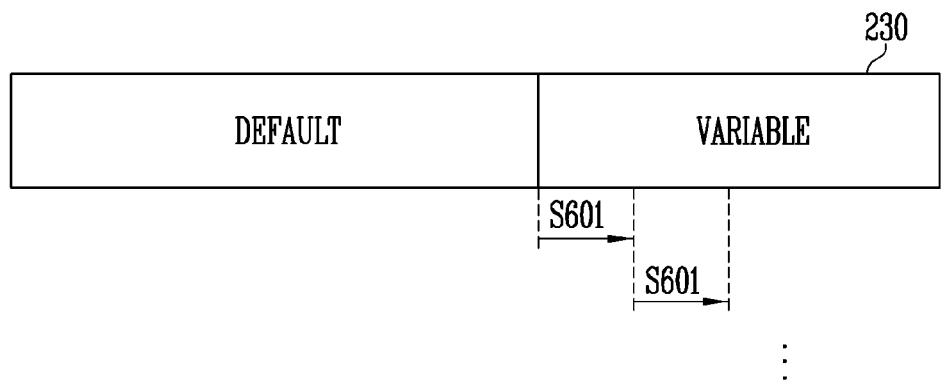
FIG. 6 shows the configuration of a buffer memory of FIG. 4, in accordance with an embodiment of the present disclosure.

FIG. 6 shows the configuration of the buffer memory of FIG. 4, in accordance with an embodiment of the present disclosure.

FIG. 6 shows a default area DEFAULT and a variable area VARIABLE included in the buffer memory 230 of FIG. 4. The default area DEFAULT is an area that is set to a default size in the initialization step of the storage device 50 (see FIG. 1), and the variable area VARIABLE is an area that is varied after the RLA command RLA_CMD is output from the device performance controller 220 of FIG. 4.

In an embodiment, data read from the memory device 100 (see FIG. 4) may be stored in the default area DEFAULT. The data stored in the default area DEFAULT may be output to the host 300 (see FIG. 4).

In an embodiment, in order to enhance the read performance, the size of the buffer memory 230 may be variable. For example, the data read from the memory device 100 (see FIG. 4) may be stored in the variable area VARIABLE as well as the default area DEFAULT.

To be more specific, after the device performance controller 220 (see FIG. 4) outputs the RLA command RLA_CMD, the device performance controller 220 (see FIG. 4) may detect the read performance again. After the RLA command RLA_CMD is output, the read performance may be detected based on a ratio of the size of the read data READ_Data output to the host 300 (see FIG. 4) to the size of the read data READ_DATA requested from the host 300 (see FIG. 4) during the reference amount of time.

When the device performance controller 220 (see FIG. 4) detects that the read performance is not the maximum, a portion of the variable area VARIABLE may be allocated as an area in which data read from the memory device 100 (see FIG. 4) is to be stored. A size allocated to the variable area VARIABLE may be preset.

Referring to FIG. 6, when it is detected that the read performance is not the maximum after the device performance controller 220 of FIG. 4 outputs the RLA command RLA_CMD, an area corresponding to the size S601 which is a preset size in the variable area VARIABLE may be allocated as an area in which data is to be stored.

Thereafter, the device performance controller 220 of FIG. 4 may detect the read performance until the read performance reaches the maximum, and the area corresponding to the size S601 which is the preset size in the variable area VARIABLE until the read performance reaches the maximum may be allocated as an area in which data is stored.

Consequently, the read performance may be enhanced by sequentially increasing a portion of the variable area VARIABLE in which the data is to be stored, until the read performance reaches the maximum.

Figure 7:
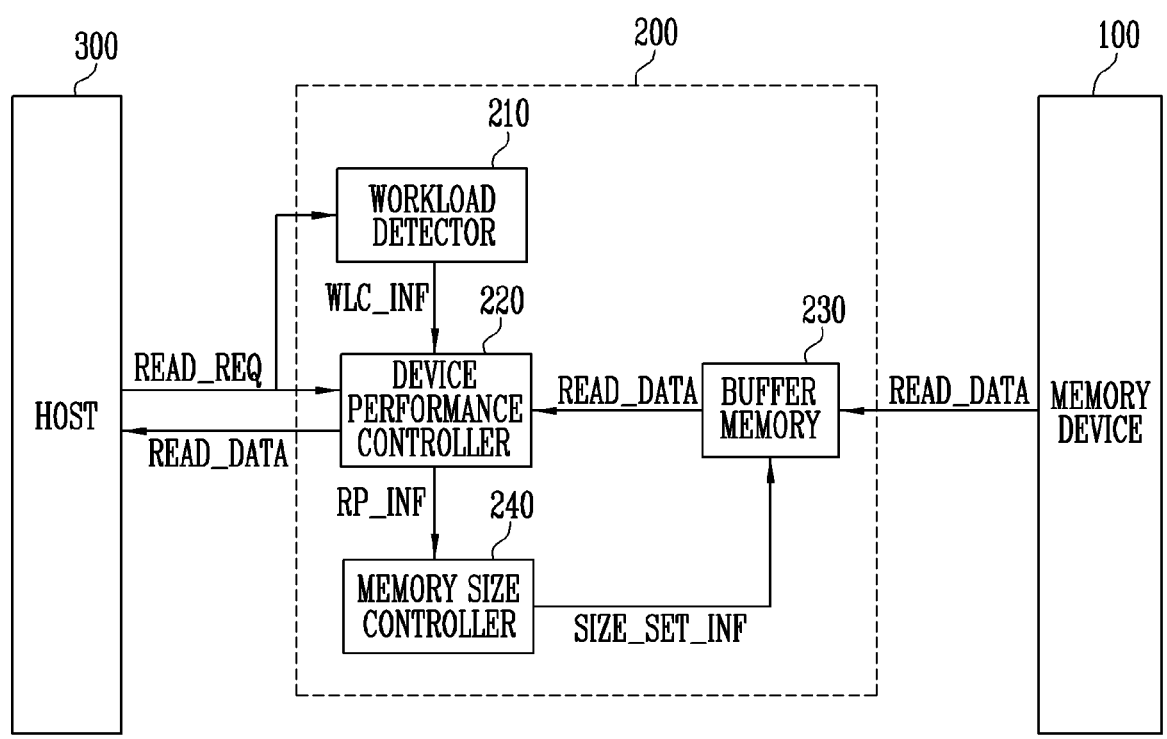
FIG. 7 shows a method of changing the size of the buffer memory, in accordance with an embodiment of the present disclosure.

FIG. 7 shows a method of changing the size of the buffer memory in accordance with an embodiment of the present disclosure.

FIG. 7 illustrates a state after the device performance controller 220 of FIG. 4 outputs the RLA command RLA_CMD to the memory device 100, and the read data READ_DATA corresponding to the RLA command RLA_CMD is received from the memory device 100. The memory controller 200 of FIG. 7 may include a workload detector 210, a device performance controller 220, a buffer memory 230, and a memory size controller 240.

In an embodiment, in response to the RLA command RLA_CMD, the read data READ_DATA may be received from the memory device 100. The read data READ_DATA corresponding to the RLA command RLA_CMD may be data which is frequently output to the host 300. The read data READ_DATA read from the memory device 100 may be stored in the buffer memory 230, and then be output to the host 300 through the device performance controller 220.

If the read data READ_DATA corresponding to the RLA command RLA_CMD is received from the memory device 100, it is unnecessary to read corresponding data from the memory device 100 again, so that the read performance can be improved. However, it is necessary to perform an operation for maximizing the read performance.

For instance, after receiving the read data READ_DATA corresponding to the RLA command RLA_CMD from the memory device 100, the device performance controller 220 may detect the read performance again every preset period. The read performance may be determined by a ratio of the size of data output to the host 300 to the size of data requested from the host 300 during the reference amount of time. As the size ratio comes closer to '1', the read performance may be increased.

When the device performance controller 220 detects that the read performance is the maximum, the device performance controller 220 may not perform a separate operation. Since the read performance is the maximum, an operation for setting the read performance to the maximum may not be required.

However, when the device performance controller 220 detects that the read performance is not the maximum, read performance information RP_INF indicating that the read performance is not the maximum may be output to the memory size controller 240.

The memory size controller 240 may output size setting information SIZE_SET_INF for changing the size of the buffer memory 230 based on the read performance information RP_INF to the buffer memory 230. The size setting information SIZE_SET_INF may be information indicating that the variable area of the buffer memory 230 is allocated as an area in which data of a preset size is to be stored. Thus, the buffer memory 230 may allocate a portion of the variable area as an area in which data is to be stored based on the size setting information SIZE_SET_IN F.

Thereafter, data read from the memory device 100 may be stored in a portion of the variable area as well as the default area of the buffer memory 230.

Therefore, it is possible to secure an area in which data received from the memory device 100 is to be stored by changing the size of the buffer memory 230, and it is possible to enhance read performance by increasing data output to the host 300 during a reference amount of time.

In an embodiment, after the size of the buffer memory 230 is changed, the workload detector 210 may detect again that the workload has been changed. For instance, when the read request READ_REQ received from the host 300 may be changed again from the sequential read request to the normal read request, or the cycle of the clock received from the external device may be changed, the workload detector 210 may detect that the workload has been changed.

The workload detector 210 may output the workload change information WLC_INF indicating that the workload has been changed to the device performance controller 220. If the device performance controller 220 receives the workload change information WLC_INF, the output of the RLA command RLA_CMD may be stopped, and the read performance may be detected again. If it is detected that the read performance is the maximum, the device performance controller 220 may stop operating. Moreover, if it is detected that the read performance is not the maximum, the device performance controller 220 may output the read performance information RP_INF indicating the read performance to the memory size controller 240 again and then may allocate an area in which new data is to be stored in the variable area of the buffer memory 230 again.

Figure 8:
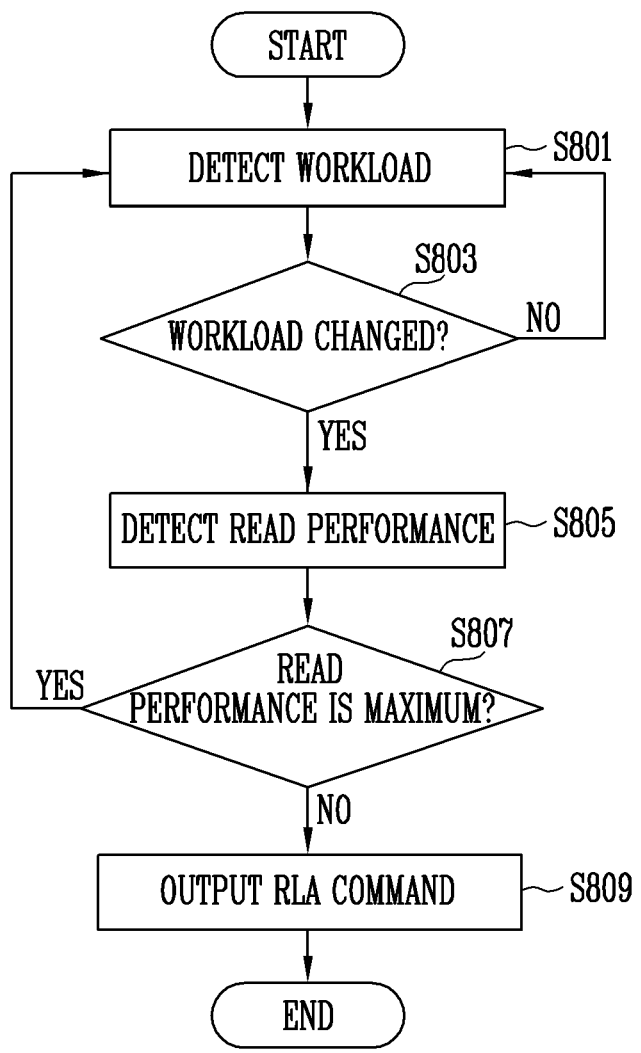
FIG. 8 is a diagram illustrating an operation of a memory controller in accordance with an embodiment of the present disclosure.

FIG. 8 is a diagram illustrating an operation of a memory controller in accordance with an embodiment of the present disclosure.

Referring to FIG. 8, in operation S801, the memory controller may detect a workload. To be more specific, when the request received from the host is changed from the normal read request to the sequential read request, the request received from the host is changed from the sequential read request to the normal read request, or the clock received from the external device is changed, the memory controller may detect the workload.

In operation S803, the memory controller may determine whether the workload has changed. If the workload is not changed (N), the process proceeds to operation S801 again and the memory controller detects the workload. If the workload is changed (Y), the process proceeds to operation S805.

In operation S805, the memory controller may detect the read performance. The read performance may be determined based on a ratio of the size of data output to the host to the size of data requested from the host during the reference amount of time. For example, when the size of data output to the host is equal to the size of data requested from the host during the reference amount of time, the read performance may be a maximum. In other words, as the size of the data output to the host during the reference amount of time increases, the read performance may be increased.

In operation S807, the memory controller may determine whether the read performance is the maximum. When the read performance is the maximum (Y), the process may proceed to operation S801 again, so that the memory controller may detect the workload. However, when the read performance is not the maximum (N), the process proceeds to operation S809.

In operation S809, the memory controller may output the RLA command. The RLA command may be a command instructing to output, in advance, data which is frequently requested from the host and is frequently output. The data output in response to the RLA command may be stored in the buffer memory in the memory controller.

In an embodiment, the data output in response to the RLA command is stored in the buffer memory, so that, when a read for the same data is subsequently requested from the host, the memory controller may output data stored in the buffer memory to the host, without the necessity of outputting a command for reading the corresponding data to the memory device. Therefore, since the operation of reading data stored in the memory device may be omitted, time required for the read operation may be reduced, and the read performance may be enhanced.

Figure 9:
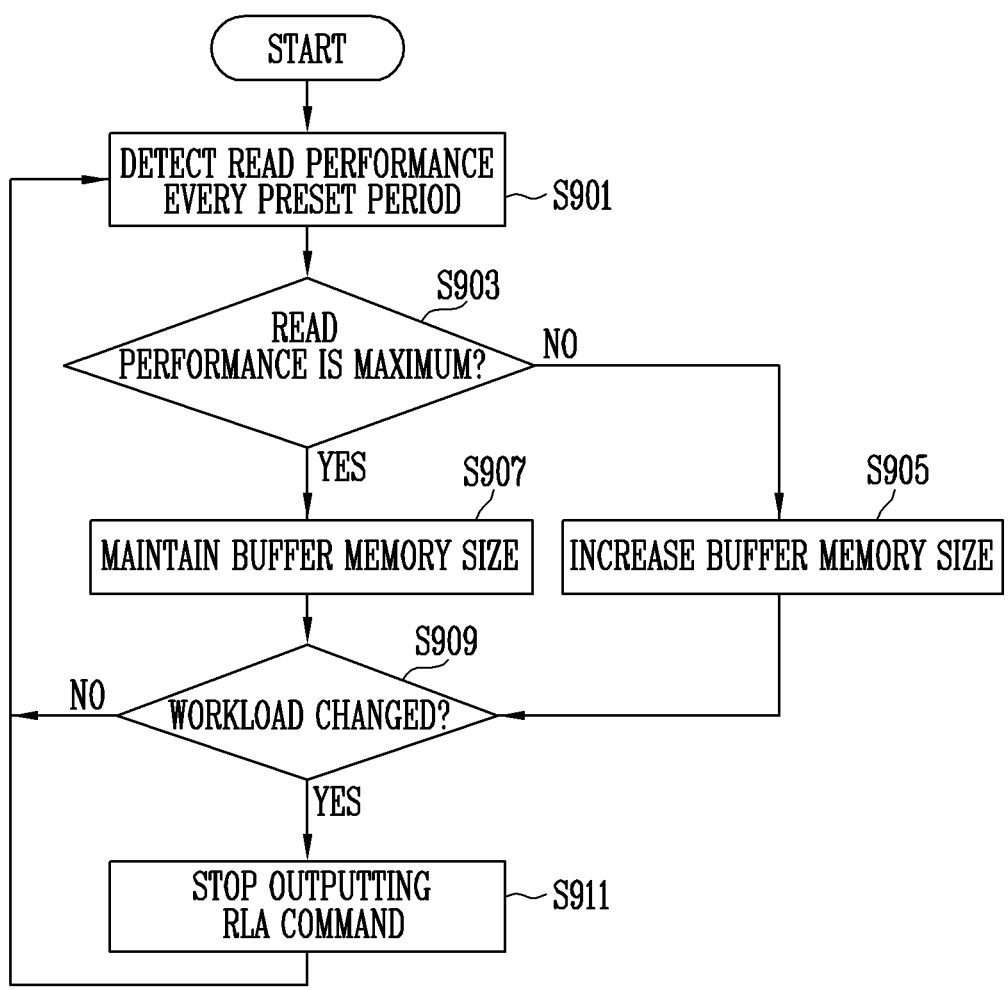
FIG. 9 is a diagram illustrating an operation of a memory controller in accordance with an embodiment of the present disclosure.

FIG. 9 is a diagram illustrating an operation of a memory controller in accordance with an embodiment of the present disclosure.

Referring to FIGS. 8 and 9, FIG. 9 shows operations after the memory controller outputs the RLA command to the memory device in operation S809 of FIG. 8.

In operation S901, the memory controller may detect the read performance every preset period. The read performance may be determined based on a ratio of the size of data output to the host to the size of data requested from the host during the reference amount of time. For example, when the size of data output to the host is equal to the size of data requested from the host during the reference amount of time, the read performance may be the maximum. That is, as the size of the data output to the host during the reference amount of time increases, the read performance may be increased.

In an embodiment, if data corresponding to the RLA command is stored in the buffer memory in the memory controller, it is unnecessary to read the data stored in the buffer memory from the memory device again. Consequently, the read performance can be enhanced. However, the operation for maximizing the read performance may be performed.

In operation S903, the memory controller may determine whether the read performance is the maximum. A case where the read performance is the maximum may mean a case where the size of data output to the host is equal to the size of data requested from the host during the reference amount of time. If the determined read performance is not the maximum (N), the process proceeds to operation S905. If the determined read performance is the maximum (Y), the process proceeds to operation S907.

In operation S905, the memory controller may increase the size of the buffer memory. For instance, by allocating an area in which data of a preset size is to be stored in the variable area among the default area and the variable area included in the buffer memory, the memory controller may increase the size of the buffer memory. By increasing the size of the buffer memory, more data output from the memory device can be stored in the buffer memory. Therefore, since more data corresponding to the RLA command is stored in the buffer memory and it is unnecessary to read data from the memory device, time required for the read operation is reduced and thereby the read performance can be enhanced.

In operation S907, the memory controller may maintain the size of the buffer memory. Since the read performance is the maximum, the size of the buffer memory may be maintained at a previously set size.

In operation S909, the memory controller may determine whether the workload has changed. To be more specific, when the request received from the host is changed from the normal read request to the sequential read request, the request received from the host is changed from the sequential read request to the normal read request, or the clock received from the external device is changed, the workload may be changed.

If the workload is not changed (N), the memory controller may proceed to operation S901 again to detect the read performance and then may increase the size of the buffer memory so that the read performance is maximized.

However, if the workload is changed (Y), the memory controller may stop outputting the RLA command. As the workload changes, the memory controller may determine again whether the read performance is the maximum in the changed workload, and determine whether the size of the buffer memory is increased based on the determined result.

Figure 10:
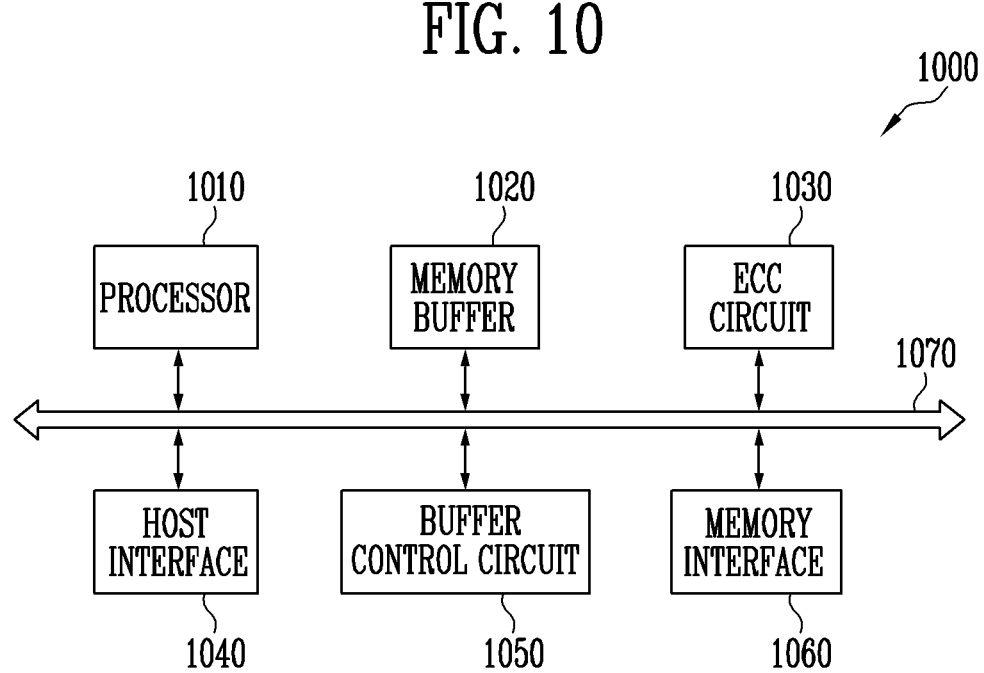
FIG. 10 is a diagram illustrating an embodiment of a memory controller of FIG. 1, in accordance with an embodiment of the present disclosure.

FIG. 10 is a diagram illustrating an embodiment of the memory controller of FIG. 1, in accordance with an embodiment of the present disclosure.

A memory controller 1000 is coupled to a host and a memory device. In response to a request from the host, the memory controller 1000 may access the memory device. For example, the memory controller 1000 may control a write operation, a read operation, an erase operation, and a background operation of the memory device. The memory controller 1000 may provide an interface between the memory device and the host. The memory controller 1000 may drive firmware for controlling the memory device.

Referring to FIG. 10, the memory controller 1000 may include a processor 1010, a memory buffer 1020, an error correction code (ECC) circuit 1030, a host Interface 1040, a buffer control circuit 1050, a memory interface 1060, and a bus 1070.

The bus 1070 may provide a channel between the components of the memory controller 1000.

The processor 1010 may control the overall operation of the memory controller 1000 and perform a logical operation. The processor 1010 may communicate with the external host through the host interface 1040 and communicate with the memory device through the memory interface 1060. In addition, the processor 1010 may communicate with the memory buffer 1020 through the buffer control circuit 1050. The processor 1010 may control the operation of the storage device by using the memory buffer 1020 as an operating memory, a cache memory, or a buffer memory.

The processor 1010 may perform the function of a flash translation layer (FTL). The processor 1010 may translate a logical block address (LBA), provided by the host, into a physical block address (PBA) through the FTL. The FTL may receive the LBA and translate the LBA into the PBA using a mapping table. An address mapping method using the FTL may be modified in various ways depending on the unit of mapping. Representative address mapping methods may include a page mapping method, a block mapping method, and a hybrid mapping method.

The processor 1010 may randomize data received from the host. For example, the processor 1010 may use a randomizing seed to randomize data received from the host. Randomized data may be provided to the memory device as data to be stored, and may be programmed to the memory cell array.

The processor 1010 may drive software or firmware to perform the randomizing operation or the derandomizing operation.

The memory buffer 1020 may be used as an operating memory, a cache memory, or a buffer memory of the processor 1010. The memory buffer 1020 may store codes and commands to be executed by the processor 1010. The memory buffer 1020 may store data to be processed by the processor 1010. The memory buffer 1020 may include a static RAM (SRAM) or a dynamic RAM (DRAM).

The ECC circuit 1030 may perform error correction. The ECC circuit 1030 may perform an ECC encoding operation based on data to be written to the memory device through the memory interface 1060. ECC encoded data may be transmitted to the memory device through the memory interface 1060. The ECC circuit 1030 may perform an ECC decoding operation on data received from the memory device through the memory interface 1060. For example, the ECC circuit 1030 may be included in the memory interface 1060 as a component of the memory interface 1060.

The host interface 1040 may communicate with the external host under control of the processor 1010. The host interface 1040 may perform communication using at least one of various communication standards or interfaces such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), multi-media card (MMC), an embedded MMC (eMMC), a dual in-line memory module (DIMM), a registered DIMM (RDIMM), and a load reduced DIMM (LRDIMM) communication methods.

The buffer control circuit 1050 may control the memory buffer 1020 under control of the processor 1010.

The memory interface 1060 may communicate with the memory device under control of the processor 1010. The memory interface 1060 may communicate a command, an address, and data with the memory device through the channel.

For example, the memory controller 1000 may include neither the memory buffer 1020 nor the buffer control circuit 1050.

For example, the processor 1010 may control the operation of the memory controller 1000 by using codes. The processor 1010 may load codes from a nonvolatile memory device (e.g., a read only memory) provided in the memory controller 1000. Alternatively, the processor 1010 may load codes from the memory device through the memory interface 1060.

For example, the bus 1070 of the memory controller 1000 may be divided into a control bus and a data bus. The data bus may transmit data in the memory controller 1000. The control bus may transmit control information such as a command and an address in the memory controller 1000. The data bus and the control bus may be separated from each other and may neither interfere with each other nor affect each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

In an embodiment, the processor 1010 may detect a change in workload. The change in workload may mean that the request received from the host 300 (see FIG. 1) is changed from the normal read request to the sequential read request, or is changed from the sequential read request to the normal read request, or that a clock input from an external device is changed. The normal read request may be a request instructing to read data stored in a specific area of the memory device 100 (see FIG. 1), while the sequential read request may be a request instructing to read data continuously stored in the memory device 100 (see FIG. 1).

In an embodiment, if the workload in which the request received from the host 300 (see FIG. 1) is changed from the normal read request to the sequential read request is detected, the processor 1010 may output the RLA command to the memory device 100 (see FIG. 1). The RLA command may be a command output to the memory device 100 (see FIG. 1) to cache, in advance, data which is frequently requested from the host 300 (see FIG. 1), in the memory buffer 1020. In order to improve the read performance according to the sequential read request of the host 300 (see FIG. 1), the data which is frequently requested from the host 300 (see FIG. 1) may be stored in the memory buffer 1020. In response to the RLA command, the memory device 100 of FIG. 1 may output the corresponding data, and the memory buffer 1020 may store the corresponding data.

Subsequently, the processor 1010 may determine the read performance every preset period. The read performance may be determined by a ratio of the size of data output to the host 300 (see FIG. 1) to the size of data requested from the host 300 (see FIG. 1) during the reference amount of time. The larger the size of data output to the host 300 (see FIG. 1) is, the higher the read performance may be. Furthermore, when the ratio of the size of the data output to the host 300 (see FIG. 1) to the size of the data requested from the host 300 (see FIG. 1) is '1', the read performance may be the maximum.

In an embodiment, if the read performance is the maximum, the processor 1010 may detect a change in workload again. If the read performance is not the maximum, the processor 1010 may increase the size of the memory buffer 1020. Here, the memory buffer 1020 may be composed of a default area allocated as default when the storage device 50 (see FIG. 1) is initialized and a variable area that is variable. The processor 1010 may increase the size of the memory buffer 1020 by allocating a portion of the variable area, as an area in which data is to be stored, by a preset size.

In an embodiment, if the size of the memory buffer 1020 increases, the processor 1010 may detect a change in workload again. If the workload is not changed, the processor 1010 may detect the read performance again at a preset period, and increase the size of the memory buffer 1020 until the read performance is maximized. However, if the workload is changed, the processor 1010 may detect the read performance again at a preset period after stopping the outputting of the RLA command, and increase the size of the memory buffer 1020 until the read performance is maximized.

Consequently, by increasing the size of the memory buffer 1020, the size of data frequently requested from the host 300 (see FIG. 1), which is to be stored in the memory buffer 1020, may be increased. Therefore, since it is unnecessary to read data, which is frequently requested from the host 300 (see FIG. 1), from the memory device 100 (see FIG. 1), time required for the read operation may be reduced, and the read performance may be enhanced.

Figure 11:
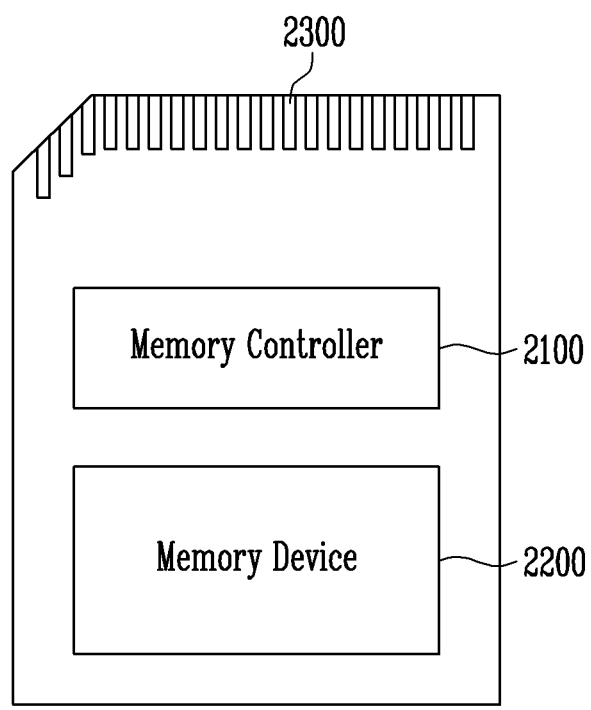
FIG. 11 is a block diagram illustrating a memory card system to which the storage device in accordance with an embodiment of the present disclosure is applied.

FIG. 11 is a block diagram illustrating a memory card system to which the storage device in accordance with an embodiment of the present disclosure is applied.

Referring FIG. 11, the memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may control a read operation, a write operation, an erase operation, and a background operation of the memory device 2200. The memory controller 2100 may provide an interface between the memory device 2200 and the host. The memory controller 2100 may drive firmware for controlling the memory device 2200. The memory device 2200 may be embodied in the same manner as that of the memory device 100 (see FIG. 1) described with reference to FIG. 1.

In an embodiment, the memory controller 2100 may include components such as a random access memory (RAM), a processing unit, a host interface, a memory interface, and an ECC circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication standards or interfaces such as universal serial bus (USB), multi-media card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication standards or interfaces.

In an embodiment, the memory device 2200 may be implemented as any of various nonvolatile memory devices, such as an electrically erasable and programmable ROM (EEPROM), a NAND flash memory, a NOR flash memory, a phase-change RAM (PRAM), a resistive RAM (ReRAM), a ferroelectric RAM (FRAM), and a spin transfer torque magnetic RAM (STT-MRAM).

The memory controller 2100 and the memory device 2200 may be integrated into a single semiconductor device to form a memory card. For example, the memory controller 2100 and the memory device 2200 may be integrated into a single semiconductor device to form a memory card such as a personal computer memory card international association (PCMCIA), a compact flash (CF) card, a smart media card (SM or SMC), a memory stick, a multimedia card (MMC, RS-MMC, or MMCmicro), a SD card (SD, miniSD, microSD, or SDHC), or a universal flash storage (UFS).

In an embodiment, the memory controller 2100 may detect a change in workload. The change in workload may mean that the request received from the host 300 (see FIG. 1) is changed from the normal read request to the sequential read request, or is changed from the sequential read request to the normal read request, or that a clock input from an external device is changed. The normal read request may be a request instructing to read data stored in a specific area of the memory device 2200, while the sequential read request may be a request instructing to read data continuously stored in the memory device 2200.

In an embodiment, if the workload in which the request received from the host 300 (see FIG. 1) is changed from the normal read request to the sequential read request is detected, the memory controller 2100 may output the RLA command to the memory device 2200. The RLA command may be a command output to the memory device 2200 to cache, in advance, data which is frequently requested from the host 300 (see FIG. 1), in the buffer memory in the memory controller 2100. In order to improve the read performance according to the sequential read request of the host 300 (see FIG. 1), the data which is frequently requested from the host 300 (see FIG. 1) may be stored in the buffer memory in the memory controller 2100. In response to the RLA command, the memory device 2200 may output the corresponding data, and the buffer memory in the memory controller 2100 may store the corresponding data.

Subsequently, the memory controller 2100 may determine the read performance every preset period. The read performance may be determined by a ratio of the size of data output to the host 300 (see FIG. 1) to the size of data requested from the host 300 (see FIG. 1) during the reference amount of time. The larger the size of data output to the host 300 (see FIG. 1) is, the higher the read performance may be. Furthermore, when the ratio of the size of the data output to the host 300 (see FIG. 1) to the size of the data requested from the host 300 (see FIG. 1) is '1', the read performance may be the maximum.

In an embodiment, if the read performance is the maximum, the memory controller 2100 may detect a change in workload again. If the read performance is not the maximum, the memory controller 2100 may increase the size of the buffer memory in the memory controller 2100. Here, the buffer memory in the memory controller 2100 may be composed of a default area allocated as default when the storage device 50 (see FIG. 1) is initialized and a variable area that is variable. The memory controller 2100 may increase the size of the buffer memory in the memory controller 2100 by allocating a portion of the variable area as an area in which data is to be stored in a predetermined size.

In an embodiment, if the size of the buffer memory in the memory controller 2100 increases, the memory controller 2100 may detect a change in workload again. If the workload is not changed, the memory controller 2100 may detect the read performance again at a preset period, and increase the size of the buffer memory in the memory controller 2100 until the read performance is maximized. However, if the workload is changed, the memory controller 2100 may detect the read performance again at a preset period after stopping the outputting of the RLA command, and increase the size of the buffer memory in the memory controller 2100 until the read performance is maximized.

Consequently, by increasing the size of the buffer memory in the memory controller 2100, the size of data frequently requested from the host 300 (see FIG. 1), which is to be stored in the buffer memory in the memory controller 2100, may be increased. Therefore, since it is unnecessary to read data, which is frequently requested from the host 300 (see FIG. 1), from the memory device 2200, time required for the read operation may be reduced, and the read performance may be enhanced.

Figure 12:
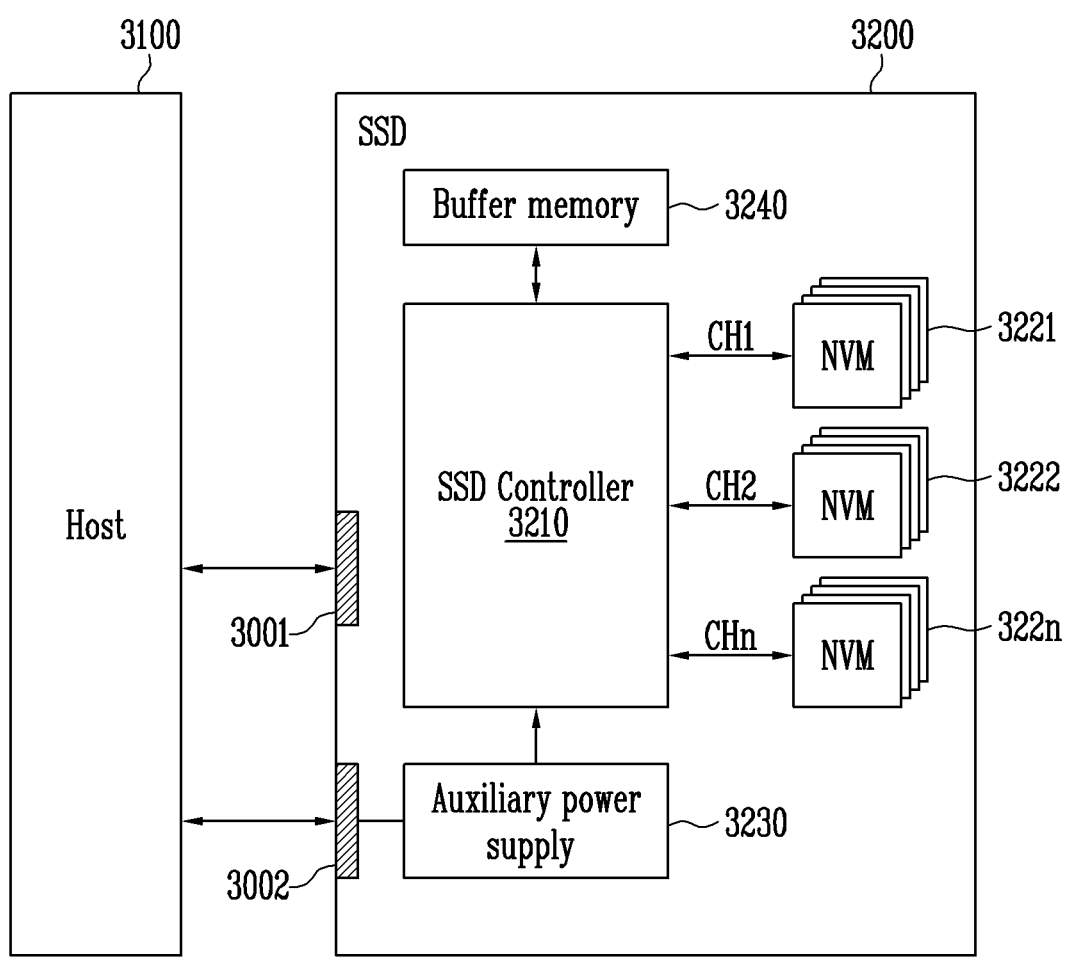
FIG. 12 is a block diagram illustrating a solid state drive (SSD) system to which the storage device in accordance with an embodiment of the present disclosure is applied.

FIG. 12 is a block diagram illustrating a solid state drive (SSD) system to which the storage device in accordance with an embodiment of the present disclosure is applied.

Referring to FIG. 12, the SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322n, an auxiliary power supply 3230, and a buffer memory 3240.

In an embodiment, the SSD controller 3210 may perform the function of the memory controller 200 (see FIG. 1), described above with reference to FIG. 1.

The SSD controller 3210 may control the plurality of flash memories 3221 to 322n in response to the signals SIG received from the host 3100. In an embodiment, the signals SIG may be signals based on an interface between the host 3100 and the SSD 3200. For example, the signals SIG may be signals defined by at least one of various communication standards or interfaces such as universal serial bus (USB), multi-media card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100, and may be charged by the power PWR. The auxiliary power supply 3230 may supply the power to the SSD 3200 when the supply of power from the host 3100 is not smoothly performed. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322n or may temporarily store metadata (e.g., a mapping table) of the flash memories 3221 to 322n. The buffer memory 3240 may include volatile memories such as DRAM, SDRAM, DDR SDRAM, LPDDR SDRAM, and GRAM or nonvolatile memories such as FRAM, ReRAM, STT-MRAM, and PRAM.

In an embodiment, the SSD controller 3210 may detect a change in workload. The change in workload may mean that the request received from the host 3100 is changed from the normal read request to the sequential read request, or is changed from the sequential read request to the normal read request, or that a clock input from an external device is changed. The normal read request may be a request for instructing to read data stored in a specific area of any of a plurality of flash memories 3221 to 322n. The sequential read request may be a request for instructing to read data which is continuously stored in any of the plurality of flash memories 3221 to 322n.

In an embodiment, when a workload in which the request received from the host 3100 changes from the normal read request to the sequential read request is detected, the SSD controller 3210 may output the RLA command to any of the plurality of flash memories 3221 to 322n. The RLA command may be a command output to the plurality of flash memories 3221 to 322n to cache, in advance, data frequently requested from the host 3100 in the buffer memory 3240. In order to improve the read performance according to the sequential read request of the host 3100, the data which is frequently requested from the host 3100 may be stored in the buffer memory 3240. In response to the RLA command, the plurality of flash memories 3221 to 322n may output the corresponding data, and the buffer memory 3240 may store the corresponding data.

Subsequently, the SSD controller 3210 may determine the read performance every preset period. The read performance may be determined by a ratio of the size of data output to the host 3100 to the size of data requested from the host 3100 during the reference amount of time. The larger the size of data output to the host 3100 is, the higher the read performance may be. Furthermore, when the ratio of the size of the data output to the host 3100 to the size of the data requested from the host 3100 is '1', the read performance may be the maximum.

In an embodiment, if the read performance is the maximum, the SSD controller 3210 may detect a change in workload again. If the read performance is not the maximum, the SSD controller 3210 may increase the size of the buffer memory 3240. Here, the buffer memory 3240 may be composed of a default area allocated as default when the storage device 50 (see FIG. 1) is initialized and a variable area that is variable. The SSD controller 3210 may increase the size of the buffer memory 3240 by allocating a portion of the variable area as an area in which data is to be stored in a predetermined size.

In an embodiment, if the size of the buffer memory 3240 increases, the SSD controller 3210 may detect a change in workload again. If the workload is not changed, the SSD controller 3210 may detect the read performance again at a preset period, and increase the size of the buffer memory 3240 until the read performance becomes the maximum. However, if the workload is changed, the SSD controller 3210 may detect the read performance again at a preset period after stopping the outputting of the RLA command, and increase the size of the buffer memory 3240 until the read performance becomes the maximum.

Consequently, by increasing the size of the buffer memory 3240, the size of data frequently requested from the host 3100, which is to be stored in the buffer memory 3240, may be increased. Therefore, since it is unnecessary to read data, which is frequently requested from the host 3100, from any of the plurality of flash memories 3221 to 322n, time required for the read operation may be reduced, and the read performance may be enhanced.

Figure 13:
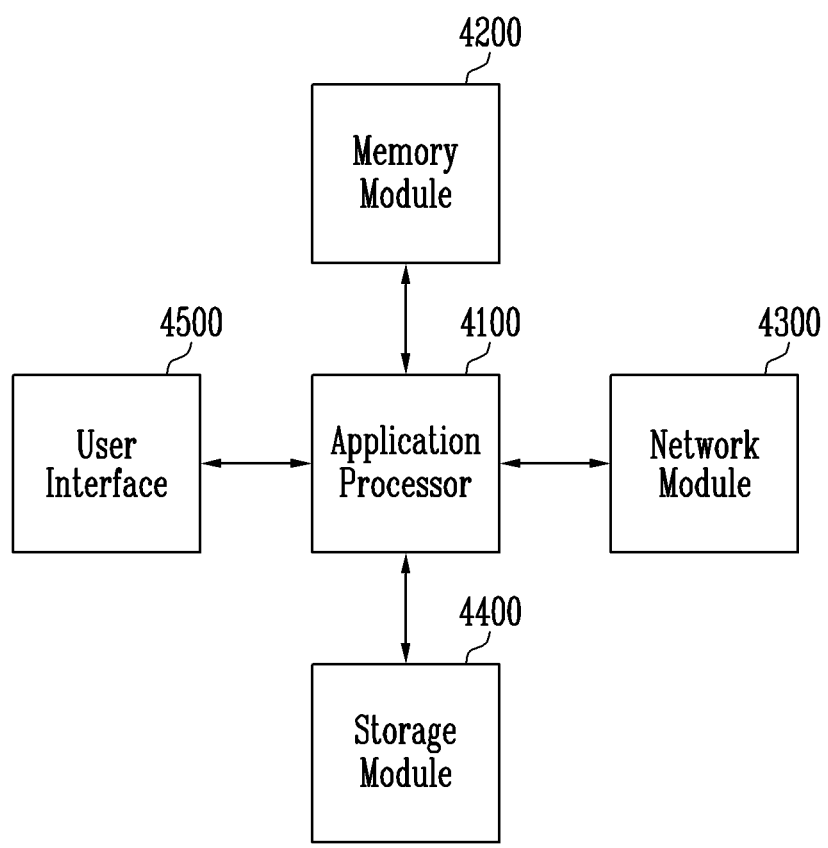
FIG. 13 is a block diagram illustrating a user system to which the storage device in accordance with an embodiment of the present disclosure is applied.

FIG. 13 is a block diagram illustrating a user system to which the storage device in accordance with an embodiment of the present disclosure is applied.

Referring to FIG. 13, the user system 4000 may include an application processor 4100, a memory module 4200, a network module 4300, a storage module 4400, and a user interface 4500.

The application processor 4100 may run components included in the user system 4000, an operating system (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, an operating memory, a buffer memory, or a cache memory of the user system 4000. The memory module 4200 may include a volatile RAM such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a nonvolatile RAM such as a PRAM, a ReRAM, an MRAM, and an FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as code division multiple access (CDMA), global system for mobile communication (GSM), wideband CDMA (WCDMA), CDMA-2000, time division multiple access (TDMA), long term evolution (LTE), WiMAX, WLAN, UWB, Bluetooth, or WI-FI communication. In an embodiment, the network module 4300 may be included in the application processor 4100.

The storage module 4400 may store data therein. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a phase-change RAM (PRAM), a magnetic RAM (MRAM), a resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, and each of the plurality of nonvolatile memory devices may be operated in the same manner as that of the memory device 100 described above with reference to FIGS. 2 to 3. The storage module 4400 may be operated in the same manner as that of the storage device 50 described above with reference to FIG. 1.

The user interface 4500 may include interfaces for inputting data or instructions to the application processor 4100 or outputting data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as an a Liquid Crystal Display (LCD), an Organic Light Emitting Diode (OLED) display device, an Active Matrix OLED (AMOLED) display device, an LED, a speaker, a monitor, and so on.

In an embodiment, the application processor 4100 may detect a change in workload. The change in workload may mean that the request received from the host 300 (see FIG. 1) is changed from the normal read request to the sequential read request, or is changed from the sequential read request to the normal read request, or that a clock input from an external device is changed. The normal read request may be a request instructing to read data stored in a specific area of a storage module 4400, while the sequential read request may be a request instructing to read data continuously stored in the storage module 4400.

In an embodiment, if the workload in which the request received from the host 300 (see FIG. 1) is changed from the normal read request to the sequential read request is detected, the application processor 4100 may output the RLA command to the storage module 4400. The RLA command may be a command output to the storage module 4400 to cache, in advance, data which is frequently requested from the host 300 (see FIG. 1), in the memory module 4200. In order to improve the read performance according to the sequential read request of the host 300 (see FIG. 1), the data which is frequently requested from the host 300 (see FIG. 1) may be stored in the memory module 4200. In response to the RLA command, the storage module 4400 may output the corresponding data, and the memory module 4200 may store the corresponding data.

Subsequently, the application processor 4100 may determine the read performance every preset period. The read performance may be determined by a ratio of the size of data output to the host 300 (see FIG. 1) to the size of data requested from the host 300 (see FIG. 1) during the reference amount of time. The larger the size of data output to the host 300 (see FIG. 1) is, the higher the read performance may be. Furthermore, when the ratio of the size of the data output to the host 300 (see FIG. 1) to the size of the data requested from the host 300 (see FIG. 1) is '1', the read performance may be the maximum.

In an embodiment, if the read performance is the maximum, the application processor 4100 may detect a change in workload again. If the read performance is not the maximum, the application processor 4100 may increase the size of the memory module 4200. Here, the memory module 4200 may be composed of a default area allocated as default when the storage device 50 (see FIG. 1) is initialized and a variable area that is variable. The application processor 4100 may increase the size of the memory module 4200 by allocating a portion of the variable area as an area in which data is to be stored in a predetermined size.

In an embodiment, if the size of the memory module 4200 increases, the application processor 4100 may detect a change in workload again. If the workload is not changed, the application processor 4100 may detect the read performance again at a preset period, and increase the size of the memory module 4200 until the read performance becomes the maximum. However, if the workload is changed, the application processor 4100 may detect the read performance again at a preset period after stopping the outputting of the RLA command, and increase the size of the memory module 4200 until the read performance becomes the maximum.

Consequently, by increasing the size of the memory module 4200, the size of data frequently requested from the host 300 (see FIG. 1), which is to be stored in the memory module 4200, may be increased. Therefore, since it is unnecessary to read data, which is frequently requested from the host 300 (see FIG. 1), from the storage module 4400, time required for the read operation may be reduced, and the read performance may be enhanced.

According to the present disclosure, a RLA command is output based on the result of determining read performance when a workload is changed, and then the size of a buffer memory is increased based on the measured read performance, so that the read performance of a storage device can be enhanced.

While the present invention has been described with respect to the specific embodiments, it will be apparent to those skilled in the art that various changes and modifications may be made without departing from the spirit and scope of the invention as defined in the following claims. Furthermore, the embodiments may be combined to form additional embodiments.

What is claimed is:

1. A memory controller for controlling a memory device, the memory controller comprising:
    a workload detector configured to determine a change in workload based on reception of a changed request from a host or a change in clock received from an external device;
    a device performance controller configured to periodically determine read performance corresponding to a ratio of a size of data output to the host to a size of data requested from the host until the workload is changed, and to output a read-look-ahead (RLA) command to the memory device based on the read performance;
    a buffer memory comprising a variable area allocated to store data read from the memory device in response to the RLA command; and a memory size controller configured to increase a size of the variable area until the read performance is at a maximum.

2. The memory controller according to claim 1, wherein the workload detector determines the workload as changed when a request changed from a normal read request to a sequential read request is received from the host, and
wherein the normal read request is a request instructing to output data stored in a specific area of the memory device and the sequential read request is a request instructing to output data continuously stored in the memory device.

3. The memory controller according to claim 1, wherein the device performance controller determines that the read performance is at the maximum when the ratio is '1'.

4. The memory controller according to claim 3, wherein the device performance controller outputs the RLA command when the read performance is not at the maximum.

5. The memory controller according to claim 4, wherein, if data corresponding to the RLA command is stored in the buffer memory, the device performance controller determines the read performance again at a preset period.

6. The memory controller according to claim 5,
wherein the buffer memory further comprises a default area allocated during initialization, and
wherein, when it is determined again that the read performance is not at the maximum, the memory size controller allocates a portion of the variable area by a preset size, the portion being to store data output from the memory device.

7. The memory controller according to claim 6,
wherein the memory size controller increases the portion of the variable area by the preset size until the read performance is at the maximum.

8. The memory controller according to claim 6, wherein, if the workload detector detects that the workload has changed after the portion of the variable area is allocated by the preset size, the device performance controller determines the read performance again at the preset period after stopping the outputting of the RLA command and increases the portion of the variable area by the preset size until the read performance is at the maximum.

9. The memory controller according to claim 5,
wherein the buffer memory further comprises a default area allocated during initialization, and
wherein, if the read performance is at the maximum, the data is stored only in the default area.

10. A method of operating a memory controller configured to control a memory device, the method comprising:
determining a change in workload based on reception of a changed request from a host or a change in clock received from an external device;
determining read performance corresponding to a ratio of a size of data output to the host to a size of data requested from the host every preset period;
increasing a size of a variable area included in a buffer memory until the read performance is at a maximum;
outputting a read-look-ahead (RLA) command to the memory device based on the read performance; and
storing data read from the memory device in response to the RLA command in the variable area,
wherein the RLA command instructs to output data which is frequently requested from the host.

11. The method according to claim 10,
wherein the workload is determined as changed when a request changed from a normal read request to a sequential read request is received from the host, and
wherein the normal read request is a request instructing to output data stored in a specific area of the memory device and the sequential read request is a request instructing to output data continuously stored in the memory device.

12. The method according to claim 10, wherein the read performance is determined as at the maximum when the ratio is '1'.

13. The method according to claim 12, wherein the RLA command is output to the memory device when the read performance is not at the maximum.

14. The method according to claim 13, further comprising determining, after the storing of the data read from the memory device in the variable area, the read performance again at the preset period.

15. A memory system comprising:
a memory device configured to store data;
a cache configured to cache data read from the device and to be provided to an external; and
a controller configured to:
perform, according to a current read performance of the system, a read-look-ahead (RLA) operation on data stored in the device when the system has a heavy workload, and
adjust, according to a current read performance of the system, a size of the cache when the system has a light workload,
wherein the controller is further configured to periodically determine the current read performance of the system during the RLA operation and increase the size until the current read performance is a predetermined value, and
wherein the current read performance is a ratio of a first amount to a second amount during a current amount of time, the first amount being a data amount output from the system in response to one or more requests from the external and the second amount being a data amount requested by the requests.

16. The memory system of claim 15,
wherein the system has the heavy workload when receiving a sequential access request from the external, and
wherein the system has the light workload when receiving a normal access request from the external.

17. The memory system of claim 15,
wherein the system has the heavy workload when an operation speed thereof becomes greater than a threshold, and
wherein the system has the light workload when the operation speed becomes the threshold or less.

18. The memory system of claim 15, wherein the controller performs the RLA operation when the current read performance is the predetermined value or less.

19. The memory system of claim 15, wherein the controller adjusts the size by maintaining the size when the current read performance is a predetermined value or greater.

* * * * *